US010027770B2

United States Patent
Bravo et al.

(10) Patent No.: US 10,027,770 B2
(45) Date of Patent: Jul. 17, 2018

(54) EXPECTED LOCATION-BASED ACCESS CONTROL

(71) Applicant: International Business Machines Corporation, Armonk, NY (US)

(72) Inventors: Jose Bravo, Mamaroneck, NY (US); Jeffery L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 14/257,107

(22) Filed: Apr. 21, 2014

(65) Prior Publication Data

US 2015/0304435 A1    Oct. 22, 2015

(51) Int. Cl.
*H04L 29/08* (2006.01)
*H04L 29/06* (2006.01)

(52) U.S. Cl.
CPC .............. *H04L 67/18* (2013.01); *H04L 63/08* (2013.01); *H04L 63/107* (2013.01)

(58) Field of Classification Search
CPC ........................... H04L 63/107; H04L 63/108
See application file for complete search history.

(56) References Cited

U.S. PATENT DOCUMENTS

| 7,747,645 | B2 | 6/2010 | Wahl | |
|---|---|---|---|---|
| 2003/0065677 | A1* | 4/2003 | Culp | G06Q 10/109 |
| 2004/0181602 | A1* | 9/2004 | Fink | 709/229 |
| 2008/0119958 | A1* | 5/2008 | Bear | A61J 7/0481 |
| | | | | 700/244 |
| 2009/0113435 | A1* | 4/2009 | Mizrachi | G06F 11/1461 |
| | | | | 718/102 |
| 2010/0175116 | A1* | 7/2010 | Gum | 726/6 |
| 2011/0202269 | A1* | 8/2011 | Reventlow | 701/201 |
| 2011/0246196 | A1* | 10/2011 | Bhaskaran | G10L 17/24 |
| | | | | 704/235 |
| 2011/0296490 | A1* | 12/2011 | Faitelson | G06F 21/6218 |
| | | | | 726/1 |
| 2013/0055370 | A1 | 2/2013 | Goldberg et al. | |
| 2013/0109351 | A1 | 5/2013 | Kato | |
| 2013/0218838 | A1* | 8/2013 | Bevan | G06F 17/30129 |
| | | | | 707/626 |
| 2014/0012866 | A1* | 1/2014 | Bowman | G06F 17/30634 |
| | | | | 707/755 |

OTHER PUBLICATIONS

Wikipedia, "Access control", From Wikipedia, the free encyclopedia, retrieved on Apr. 21, 2014 from website: <http://en.wikipedia.org/wiki/Access_control>.

* cited by examiner

*Primary Examiner* — Samson Lemma
*Assistant Examiner* — Arya Golriz
(74) *Attorney, Agent, or Firm* — Edward J. Wixted, III (57) ABSTRACT

In an approach for authenticating a user attempting to access to a resource, a processor receives an indication of a user attempting to access a resource within a timeframe, wherein the indication includes a location of the user. A processor identifies a location requirement for the user attempting to access the resource, wherein the location requirement originates from an entry indicating an expected location of the user within the timeframe, and wherein the entry is unmodifiable by the user. A processor determines whether the expected location of the user matches, within a threshold, the received location of the user attempting to access the resource.

16 Claims, 3 Drawing Sheets

EXPECTED LOCATION-BASED ACCESS CONTROL

FIELD OF THE INVENTION

The present invention relates generally to access control, and more particularly to geographically-based access control.

BACKGROUND OF THE INVENTION

Computer networks, particularly those with global reach such as the Internet, have greatly influenced the way transactions are conducted and the way data is stored and retrieved. With the growth of the Internet, user authentication has become increasingly important for both computer systems and networks. Secure access to computer systems and computer networks has been traditionally implemented using a user identification (userid) and password pair. This requires the user to protect their userid and password from unauthorized use. If the userid and password are not protected, accounts and files can be compromised. For example, if a first user knows the userid and password of a second user, then the first user may easily access the second user's account information without being authorized to do so.

SUMMARY

Aspects of an embodiment of the present invention disclose a method, computer program product, and computing system for authenticating a user attempting to access to a resource. A processor receives an indication of a user attempting to access a resource within a timeframe, wherein the indication includes a location of the user. A processor identifies a location requirement for the user attempting to access the resource, wherein the location requirement originates from an entry indicating an expected location of the user within the timeframe, and wherein the entry is unmodifiable by the user. A processor determines whether the expected location of the user at least matches, within a threshold, the received location of the user attempting to access the resource.

DETAILED DESCRIPTION

Figure 1:
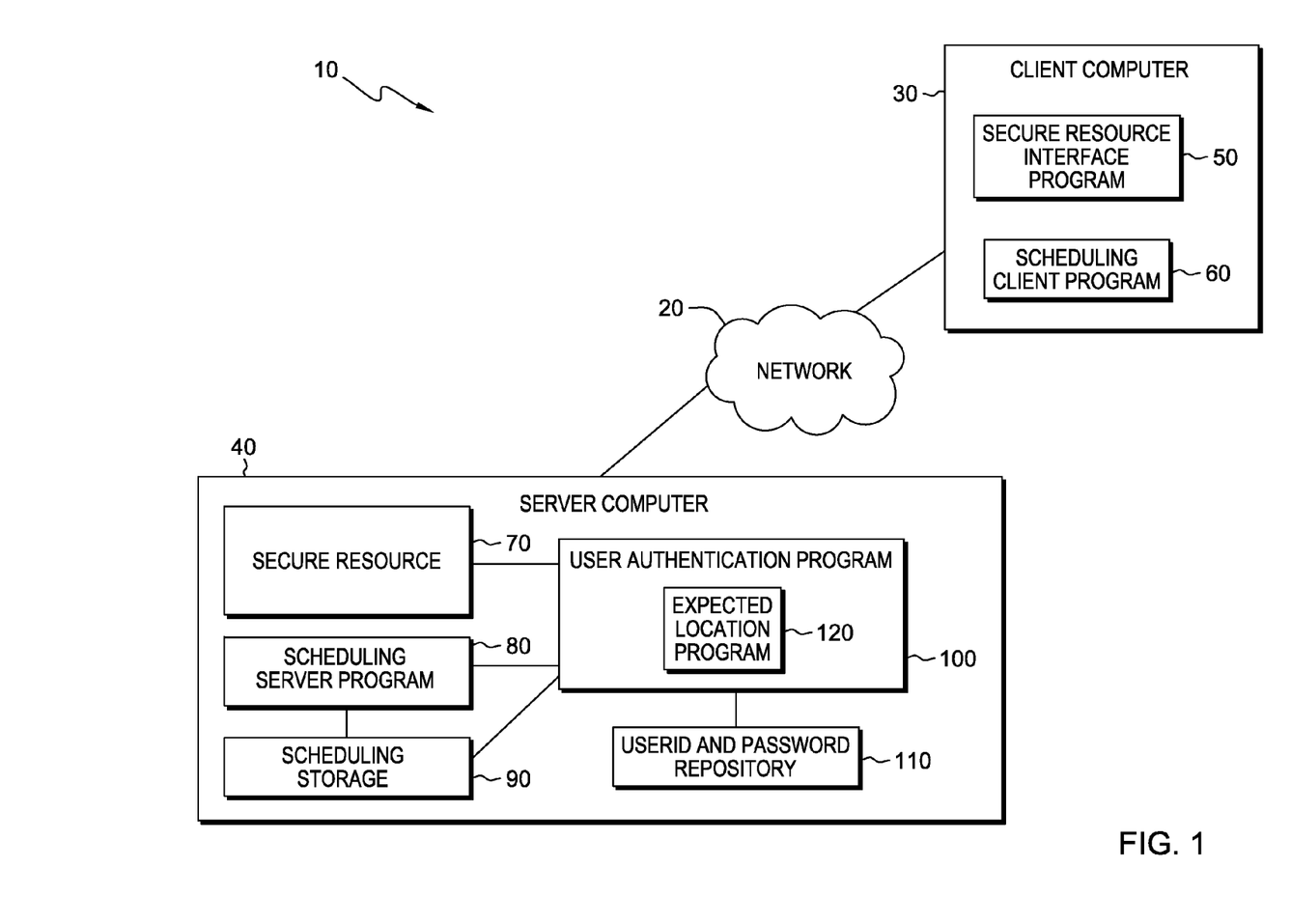
FIG. 1 is a functional block diagram illustrating a distributed data processing environment, in accordance with one embodiment of the present invention.

The present invention will now be described in detail with reference to the Figures. FIG. 1 depicts a diagram of distributed data processing environment 10, in accordance with one embodiment of the present invention. FIG. 1 provides only an illustration of one embodiment and does not imply any limitations with regard to the environments in which different embodiments may be implemented.

Distributed data processing environment 10 includes client computer 30 and server computer 40 interconnected over network 20. Network 20 may be a local area network (LAN), a wide area network (WAN) such as the Internet, a combination of the two or any combination of connections and protocols that will support communications between client computer 30 and server computer 40, in accordance with embodiments of the present invention. Network 20 may include wired, wireless, or fiber optic connections. Distributed data processing environment 10 may include additional server computers, client computers, or other devices not shown.

Client computer 30 may be a desktop computer, laptop computer, tablet computer, personal digital assistant (PDA), or smart phone. In general, client computer 30 may be any electronic device or computing system capable of processing computer program instructions, sending and receiving data, and communicating with server computer 40 over network 20, in accordance with embodiments of the present invention. In the depicted embodiment, client computer 30 includes secure resource interface program 50 and scheduling client program 60. In one embodiment, client computer 30 includes components described in reference to FIG. 3.

Server computer 40 may be a management server, a web server, or any other electronic device or computing system capable of processing computer program instructions and receiving and sending data. In the depicted embodiment, server computer 40 may represent a server computing system utilizing multiple computers as a server system, such as in a cloud computing environment. In the depicted embodiment, server computer 40 includes secure resource 70, scheduling server program 80, scheduling storage 90, user authentication program 100, user identification (userid) and password repository 110, and expected location program 120. In one embodiment, server computer 40 includes components described in reference to FIG. 3.

Secure resource 70 may be a website, a database, a data structure, or any computer resource or device that requires user authentication to access. In the depicted embodiment, secure resource 70 resides on server computer 40. In other embodiments, secure resource 70 may reside on another server or another computing device, provided that secure resource 70 is accessible to secure resource interface program 50 and user authentication program 100.

Secure resource interface program 50 operates to visualize content, such as menus and icons, and to allow a user to interact with applications or resources accessible to client computer 30, such as secure resource 70 on server computer 40, over network 20. In one embodiment, secure resource interface program 50 may be a web browser. In other embodiments, secure resource interface program 50 may be an application on a smart phone, a security system program, or any other program or application capable of visualizing content and allowing a user to interact with applications or resources accessible to client computer 30, such as secure resource 70 on server computer 40, over network 20.

Scheduling client program 60 may be a dedicated client scheduling program, a function integrated within another program, or any other program or function that can communicate with scheduling server program 80 over network 20 to provide a user interface for creating, receiving and responding to schedules and/or entries. In one embodiment, a schedule or entry may be a document that includes at least one scheduled activity. For example, a scheduled activity may be a meeting, appointment, travel plan, or any other event. A schedule or entry may include dates and times for scheduled activities. In addition, a schedule or entry may include at least one geographic location at which each respective scheduled activity is intended to take place. A schedule or entry may also include regularly scheduled activities, such as a work schedule of a user. In some embodiments, when adding a scheduled activity to a schedule or entry, the user may include at least one geographic location indicating where the scheduled activity takes place. In some embodiments, schedules and entries may be managed by a third party, such as an employer, hotel, travel agency, or other entity. In some embodiments, the user may not have the ability to alter the schedule. For example, a user may not be able to change the entry indicating the user's work schedule. Such an entry may need to be changed by the user's employer. In one embodiment, scheduling client program 60 resides on client computer 30. In other embodiments, scheduling client program 60 may reside on another server or another computing device, provided that scheduling server program 60 can communicate with scheduling server program 80.

A user at client computer 30 may use scheduling client program 60 to add, remove, or modify a scheduled activity. In one embodiment, a user at client computer 30 uses scheduling client program 60 to modify his or her schedule. For example, the user may add an appointment to his or her schedule. In another example, a user may add regularly scheduled activities to his or her schedule, such as his or her work schedule. In yet another embodiment, scheduling client program 60 automatically receives the schedule of the user from another program (not shown). In yet another embodiment, scheduling client program 60 accesses a schedule stored by another program (not shown). In some embodiments, a user may have the ability to view his or her schedule, but the user may not have the ability to modify his or her schedule. In such an embodiment, a third party may be responsible for modifying the schedule. For example, an employer may establish and populate a work schedule and/or vacation schedule, and a travel agency may manage a travel itinerary. In such examples, the schedule/itinerary may be unmodifiable by the user.

In some embodiments, a user at client computer 30 may use scheduling client program 60 to modify a schedule of a second user. For example, the user may be a travel agent, and the travel agent may modify the schedule for a client. In such an example, the user may use scheduling client program 60 to modify the schedule of the second user to include travel plans of the second user. For example, the user adds a travel itinerary to the second user's schedule. In another example, the user enters a work schedule and associated location of a second user. In such an embodiment, the second user may not have the authority or privilege to independently adjust their schedule. A scheduling user may have an interest in securing secure resource 70, and by controlling the schedule of a second user, the scheduling user may limit the locations from which the second user can access secure resource 70. Scheduling client program 60 may periodically send updated schedules to scheduling server program 80 over network 20. In another embodiment, scheduling client program 60 periodically sends schedules of users to expected location program 120 over network 20. For example, scheduling client program 60 sends a modified schedule of a user to expected location program 120 over network 20.

Scheduling server program 80 operates to receive, forward, and manage schedules received from scheduling client programs, such as scheduling client program 60, located on client computer 30 and/or other client computers (not shown). In one embodiment, scheduling server program 80 stores scheduling events managed by scheduling server program 80 to scheduling storage 90. In one embodiment, scheduling server program 80 periodically sends schedules of one or more users to expected location program 120. For example, scheduling server program 80 may send a modified schedule of a user to expected location program 120. In one embodiment, scheduling server program 80 resides on server computer 40. In other embodiments, scheduling server program 80 may reside on another server or another computing device, provided that scheduling server program 80 can communicate with scheduling client program 60, scheduling storage 90, and expected location program 120.

Scheduling storage 90 is a repository that may be written and read by scheduling server program 80 and may be accessible to scheduling server program 80, user authentication program 100, and expected location program 120. In one embodiment, scheduling storage 90 stores schedules and/or entries associated with users of scheduling server program 80. In some embodiments, scheduling storage 90 is a database. In other embodiments, scheduling storage 90 is a file. In some embodiment, scheduling storage 90 is located on server computer 40. In other embodiments, scheduling storage 90 may be located on another server computer or another computing device, provided that scheduling storage 90 is accessible to scheduling server program 80, user authentication program 100, and expected location program 120.

User authentication program 100 operates to determine whether to grant or deny a current user of client computer 30 access to secure resource 70 by determining if a userid and password, received from secure resource interface program 50, matches a stored userid and password of a user authorized to access secure resource 70. In one embodiment, user authentication program 110 accesses userid and password repository 110 and compares the userid and password sent by secure resource interface program 50 to the userids and corresponding passwords stored in userid and password repository 110. In one embodiment, user authentication program 100 is a program residing on server computer 40. In other embodiments, user authentication program 100 may reside on another server or another computing device, provided that user authentication program 100 is accessible to secure resource interface program 50 and secure resource 70 and has access to userid and password repository 110 and expected location program 120.

Userid and password repository 110 is a repository that may be written to and read by user authentication program 110. Userid and password repository 110 operates to store userids and corresponding passwords for users authorized to access secure resource 70. In one embodiment, userid and password repository 110 is a database. In one embodiment, userid and password repository 110 is located on server computer 40. In other embodiments, userid and password repository 110 may be located on another server computer or another computing device, provided that userid and password repository 110 is accessible to user authentication program 100.

Expected location program 120 operates to determine whether a current location of a user matches an expected location of the user. In one embodiment, expected location program 120 receives an indication from user authentication program 100 that a user at client computer 30 is attempting to access secure resource 70. In one embodiment, the indication includes the userid of the user. In some embodiments, the indication also includes the current geographic location of the user. In some embodiments, the indication is a geographic coordinate of the location of the user. In one embodiment, expected location program 120 is a function of user authentication program 110. In another embodiment, expected location program 120 is a stand-alone program. In one embodiment, expected location program 120 is located on server computer 40. In other embodiments, expected location program 120 may be located on another server computer or another computing device, provided that expected location program 120 has access to secure resource 70, scheduling storage 90, and userid and password repository 110.

In one embodiment, expected location program 120 accesses scheduling storage 90. In such an embodiment, expected location program 120 may parse through schedules or entries stored by scheduling storage 90. Expected location program 120 may identify a schedule or entry for the user associated with the received userid. Expected location program 120 may determine the geographic location where the user is scheduled to be based on the identified schedule or entry. For example, expected location program 120 determines from a schedule provided by a travel agency or employer that a user has travel plans and is scheduled to be in Spain during a specified timeframe. Expected location program 120 compares the user's current location (e.g. Madrid, Spain) to the users expected location (e.g. Spain). Expected location program 120 may determine that the user's current location matches the user's expected location. In some embodiments, expected location program 120 may determine that the user's current location matches the user's expected location within a predefined threshold. The predefined threshold may indicate a set of coordinates, location, or other location identifying means around the expected location within which, the user is considered to match, or partially match the expected location. Expected location program 120 may send an indication to user authentication program 100 indicating that the user's current location matches, or substantially matches, the user's expected location.

Figure 2:
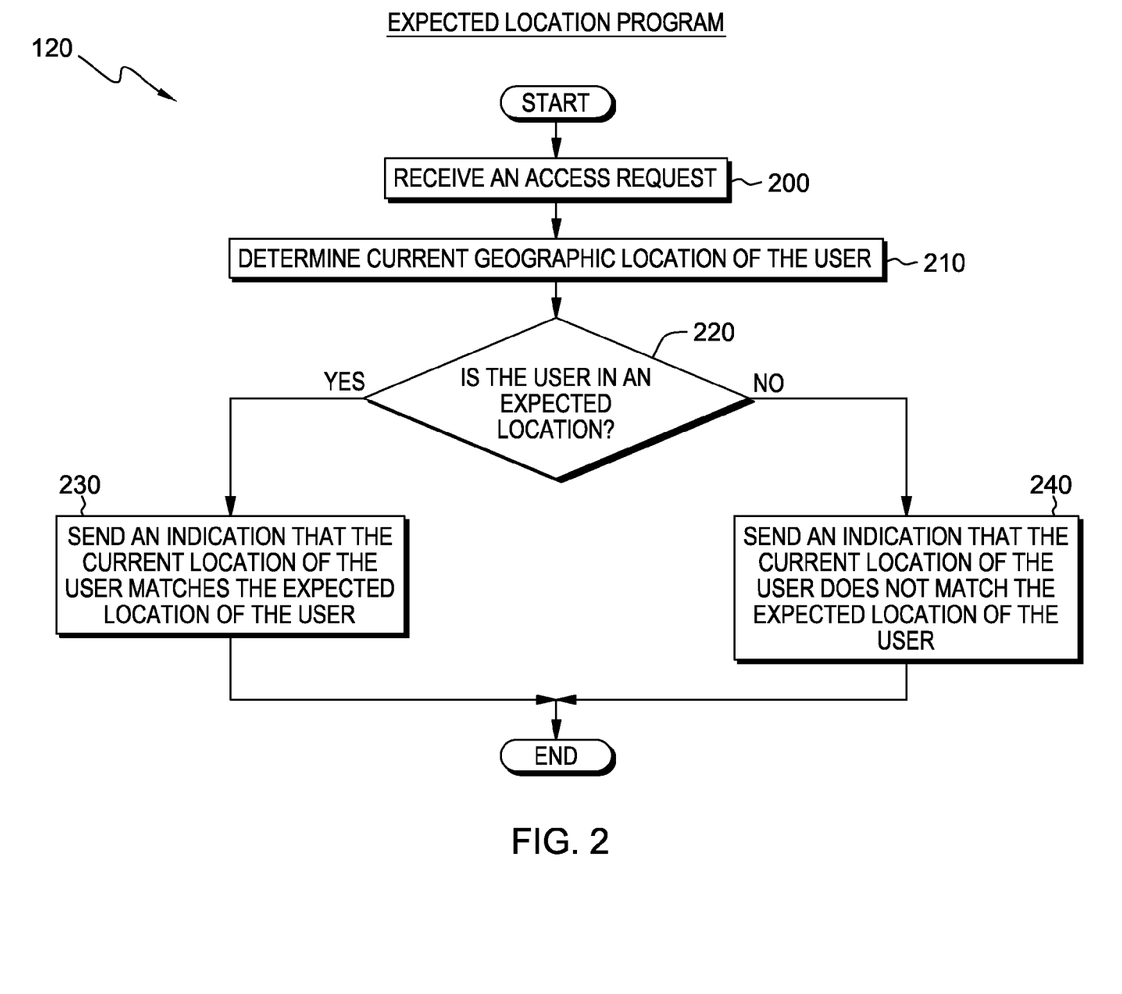
FIG. 2 is a flowchart depicting operational steps of an expected location program, executing within the environment of FIG. 1, for determining whether a current location of a user matches an expected location of a user, in accordance with one embodiment of the present invention.

FIG. 2 depicts a flowchart of the steps of expected location program 120 for determining whether a current location of a user matches an expected location of a user, in accordance with one embodiment of the present invention.

Initially, in one embodiment, a user at client computer 30 uses secure resource interface program 50 to attempt to access secure resource 70 over network 20. In some embodiments, the user enters a userid and password. Secure resource interface program 50 sends the userid and password for the user to user authentication program 100 over network 20. In one embodiment, secure resource interface program 50 further includes information indicating the geographic location of the computing device associated with the user, such as client computer 30. In one embodiment, secure resource interface program 50 sends an IP address of the user to user authentication program 100. In other embodiments, secure resource interface program 50 may send GPS coordinates, RFID tag information, or utilize triangulation techniques to indicate the geographic location of client computer 30.

User authentication program 100 receives the userid, password, and IP address (or other information used to locate the current geographic location of the user). In one embodiment, user authentication program 100 accesses userid and password repository 110 and compares the received password to the stored password for the received userid. User authentication program 100 determines that the received password matches the stored password for the userid. In one embodiment, user authentication program 100 sends an access request to expected location program 120. In another embodiment, user authentication program 100 sends an access request to expected location program 120 before user authentication program 100 authenticates the userid and password of the user.

In step 200, expected location program 120 receives an access request. In one embodiment, expected location program 120 receives an access request from user authentication program 100. The access request can include the userid and a geographic location of the user at client computer 30.

In step 210, expected location program 120 determines a current geographic location of the user. In one embodiment, expected location program 120 uses the received IP address to determine the current geographic location of the user. Expected location program 120 may determine the geographic location of client computer 30 and the user based on a received IP address. An IP address is a numerical label assigned to a device (e.g. client computer 30 or server computer 40) in a computer network (e.g. network 20) that uses the Internet Protocol for communication. An IP address serves two principal functions: 1) network interface identification, and 2) geographic location addressing. In one example, expected location program 120 determines, from the received IP address, that the current geographic location of the user is Los Angeles, Calif.

In other embodiments, expected location program 120 determines the location using global positioning system (GPS) coordinates received from client computer 30, when client computer 30 is a computing device with GPS capabilities, such as a smartphone or tablet. In another embodiment, client computer 30 may not have GPS capabilities, and expected location program 120 receives GPS coordinates of the user from an external device in the user's possession, such as a GPS receiver, cell phone, tablet, or other external device capable of communicating with client computer 30. In yet another embodiment, when client computer 30 is connected to a cellular network, expected location program 120 may receive the geographic location of a user gathered via the multilateration of radio signals between radio towers of the network and client computer 30. In yet another embodiment, expected location program 120 receives information and determines the geographic location of a user from a badging or check-in system. For example, an RFID system may be implemented within an office building that can communicate with server 30 based on active or passive RFID tags located on a user's badge, client device, or any other object or device compatible with an RFID tag. Multiple RFID tag readers may be positioned throughout the office building so that the location of the user can be determined. In other embodiments, expected location program 120 determines the current geographic location of the user from connections to specific networks. In other embodiments expected location program 120 determines the current geographic location of the user from telephone numbers or connections to specific networks.

In decision 220, expected location program 120 determines if client computer 30, and therefore the user, is at an expected location. The expected location may be a location requirement for the user to access secure resource 70. In some embodiments, the expected location originates from a schedule or entry. In one embodiment, expected location program 120 accesses scheduling storage 90 and identifies a schedule, travel itinerary, calendar, or other document specifying dates and locations where the user is expected, associated with the userid received from client computer 30. In some embodiments, the schedule or other entry was created, modified, and/or maintained by the user. In other embodiments, the schedule or other entry was created, modified, and/or maintained by a third party, such as an employer, travel agency, or other entity, and the user does not have access to adjust or otherwise modify the schedule or entry. In such an embodiment, the third party may have an interest in limiting access to secure resource 70. For example, an employer may want to make sure an employee, with legitimate purpose, is accessing secure resource 70 during actual business hours or at particular business locations. In addition, denying a user the ability to modify the schedule or entry may prevent fraudulent access by another individual attempting to modify the schedule to their present location in order to gain access to secure resource 70.

In one embodiment, expected location program 120 uses text analytics to parse through the schedule or other document. Using natural language processing and at least one set of dictionaries and rules, expected location program 120 can perform text analytics on the schedule or other document. Text analytics can be performed using an Unstructured Information Management Architecture (UIMA) application configured to analyze unstructured information to discover patterns relevant to expected location program 120 by processing plain text and identifying entities or relations.

In another embodiment, expected location program 120 accesses an e-mail repository to identify e-mail correspondence associated with the received userid. Expected location program 120 may use text analytics to parse through the e-mail correspondence. In one embodiment, expected location program 120 uses natural language processing and at least one set of dictionaries and rules to determine the user's expected location from the user's e-mail correspondence. For example, expected location program 120 determines from the e-mail correspondence that the user has travel plans to visit a friend in Los Angeles, Calif. on the current date.

In yet another embodiment, expected location program 120 accesses a cell phone memory repository, such as a memory card associated with the received userid. Expected location program 120 uses text analytics to parse through a text message correspondence. In one embodiment, expected location program 120 uses natural language processing and at least one set of dictionaries and rules to determine the user's expected location from the user's text message correspondence. For example, expected location program 120 determines from the text message correspondence that the user has travel plans to visit a friend in Los Angeles, Calif. on the current date.

In another embodiment, expected location program 120 receives the expected location of the user from scheduling server program 80. In another embodiment, expected location program 120 receives the expected location of the user from scheduling client program 60. In yet another embodiment, expected location program 120 accesses information stored by a scheduling program, such as scheduling server program 80 to scheduling storage 90, and retrieves a list of expected locations and corresponding dates and/or times within which the user is anticipated to be at the expected location. In such an embodiment, scheduling server program 80 may analyze entry information to determine a location and date or time associated with the entry using text analytic techniques previously described and/or information located in fields of the entry associated with location and date and/or time.

Expected location program 120 compares the user's current location (determined in step 210) to the one or more expected locations of the user. In decision 220, expected location program 120 determines if the user's current location matches the user's expected location. In one embodiment, expected location program 120 determines if the user's current location exactly matches the user's expected location. In another embodiment, expected location program 120 determines if the user's current location is within a pre-defined threshold, such as a radius, of the user's expected location. For example, expected location program 120 determines if the user's current location is within a 50 mile radius of the user's expected location. Alternatively, expected location program 120 may determine if the user's current location is within a certain set of GPS coordinates that define a boundary of a specified distance around the expected location. In another embodiment, expected location program 120 may determine if the IP address associated with the user matches an IP address corresponding to an expected location, such as a town or city. If expected location program 120 determines that the user's current location matches the user's expected location, expected location program 120 proceeds to step 230 (decision 220, yes branch). If expected location program 120 determines that the user's current location does not match the user's expected location, expected location program 120 proceeds to step 240 (decision 220, no branch).

In step 230, expected location program 120 sends an indication that the current location of the user matches the expected location of the user. In one embodiment, expected location program 120 sends an indication that the current location of the user matches the expected location of the user to user authentication program 100. In one embodiment, user authentication program 100 allows the user to access secure resource 70. In another embodiment, user authentication program 100 compares the received userid and password to the userid(s) and password(s) stored by userid and password repository 110. In yet another embodiment, expected location program 120 allows the user to access secure resource 70.

In step 240, expected location program 120 sends an indication that the current location of the user does not match the expected location of the user. In one embodiment, expected location program 120 sends an indication that the current location of the user does not match the expected location of the user to user authentication program 100. In one embodiment, user authentication program 100 does not allow the user to access secure resource 70. In another embodiment, expected location program 120 does not allow the user to access secure resource 70. In yet another embodiment, expected location program 120 alerts the host or administrator of secure resource 70 that the user has attempted to access secure resource 70 from an unexpected location. In yet another embodiment, expected location program 120 requires the user to provide additional authentication. For example, expected location program 120 may prompt the user to enter personal information, such as the date of birth of the user. In another embodiment, expected location program 120 prompts the user to enter a second password. In yet another embodiment, expected location program 120 requires the user to provide biometric authentication. For example, expected location program 120 prompts the user to speak into a microphone. In such an embodiment, expected location program 120 compares the user's voice to a stored voice associated with the userid and password combination entered by the user. In another embodiment, expected location program 120 requires a security token, or software token, as additional authentication. A software token is a type of two-factor authentication security device that may be used to authorize the use of computer services. Software tokens can be stored on a general-purpose electronic device such as a desktop computer, laptop, PDA, or mobile phone and can be duplicated.

Figure 3:
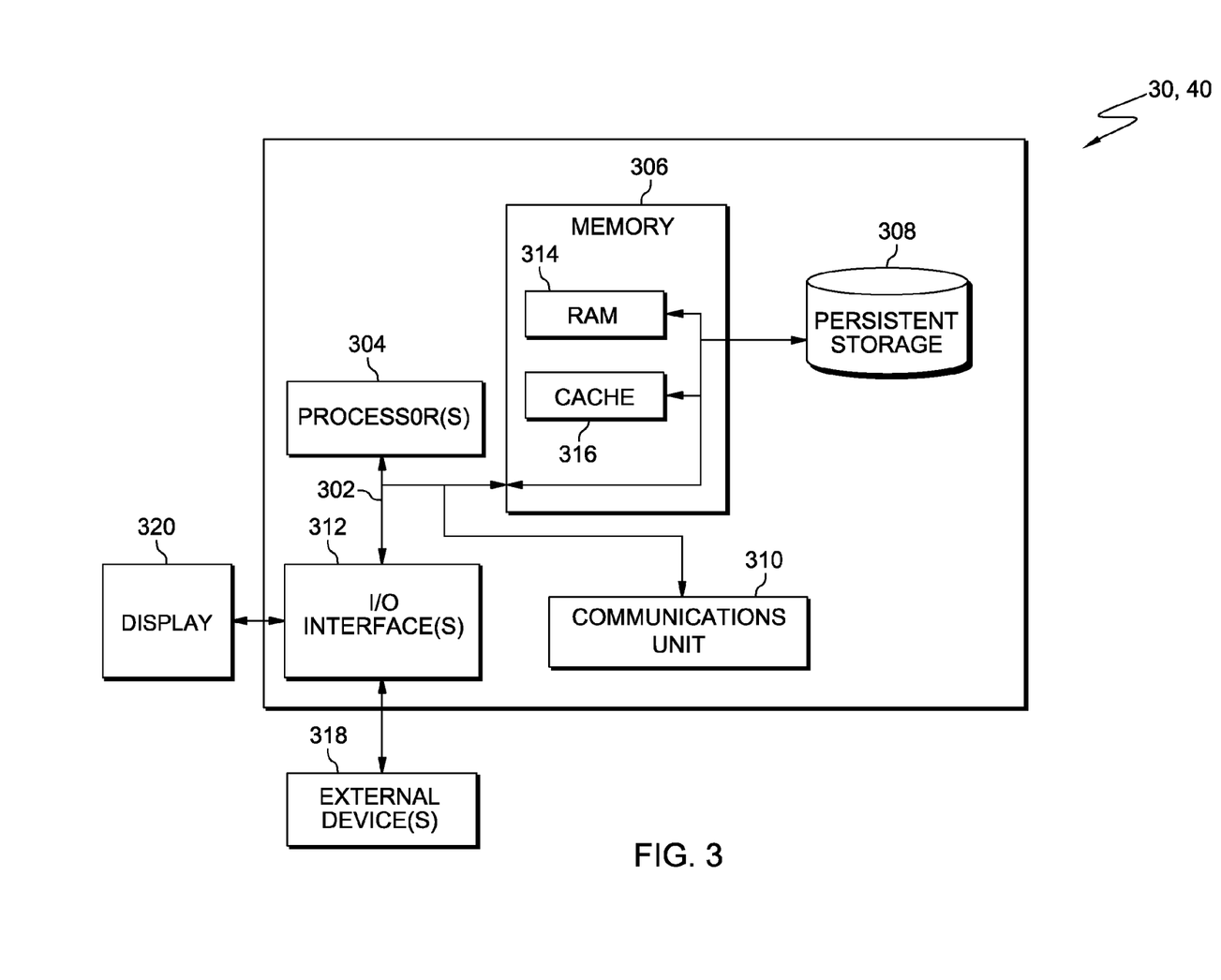
FIG. 3 depicts a block diagram of components of the server computer and the client computer of FIG. 1, in accordance with one embodiment of the present invention.

FIG. 3 depicts a block diagram of components of client computer 30 and server computer 40 in accordance with one embodiment of the present invention. It should be appreciated that FIG. 3 provides only an illustration of one implementation and does not imply any limitations with regard to the environments in which different embodiments may be implemented. Many modifications to the depicted environment may be made.

Client computer 30 and server computer 40 can each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Secure resource interface program 50 and scheduling client program 60 is stored in persistent storage 308 of client computer 30 for execution by one or more of the respective computer processors 304 of client computer 30 via one or more memories of memory 306 of client computer 30. Secure resource 70, scheduling server program 80, scheduling storage 90, user authentication program 100, userid and password repository 110, and expected location program 120 are stored in persistent storage 308 of server computer 40 for execution and/or access by one or more of the respective computer processors 304 of server computer 40 via one or more memories of memory 306 of server computer 40. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media capable of storing program instructions or digital information.

The media used by persistent storage 308 may also be removable. For example, a removable hard drive may be used for persistent storage 308. Other examples include optical and magnetic disks, thumb drives, and smart cards inserted into a drive for transfer onto another computer-readable storage medium that is also part of persistent storage 308.

Communications unit 310, in these examples, provides for communications with other servers or devices. In these examples, communications unit 310 includes one or more network interface cards. Communications unit 310 may provide communications through the use of either or both physical and wireless communications links. Secure resource interface program 50 and scheduling client program 60 may be downloaded to persistent storage 308 of client computer 30 through the communications unit 310 of client computer 30. Secure resource 70, scheduling server program 80, scheduling storage 90, user authentication program 100, userid and password repository 110, and expected location program 120 may be downloaded to persistent storage 308 of server computer 40 through the communications unit 310 of server computer 40.

I/O interface(s) 312 allows for input and output of data with other devices that may be connected to client computer 30 or server computer 40. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., secure resource interface program 50 and scheduling client program 60, can be stored on such portable computer-readable storage media and can be loaded onto persistent storage 308 of client computer 30, respectively, via the respective I/O interface(s) 312 of client computer 30. Software and data used to practice embodiments of the present invention, e.g. Secure resource 70, scheduling server program 80, scheduling storage 90, user authentication program 100, userid and password repository 110, and expected location program 120, can be stored on such portable computer-readable storage media and can be loaded onto persistent storage 308 of server computer 40 via I/O interface(s) 312 of server computer 40.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for authenticating a user attempting to access to a resource, the method comprising:
   receiving a schedule indicating an expected location of a user within a timeframe, wherein:
      text contained in the schedule was populated by an entity and the schedule is unmodifiable by the user; and
      the schedule is associated with a user identification unique to the user;
   connecting a computing device of the user to a network;
   receiving, from the computing device connected to the network, an indication, via the network, of the user attempting to access an electronic resource at a storage location that is accessible via the network, within the timeframe, wherein the indication includes the user identification unique to the user and a password;
   determining, by one or more hardware processors, a location of the first user utilizing a radio-frequency identification (RFID) system and receiving RFID tag information associated with the user, wherein the RFID tag information was obtained from an RFID tag reader of the RFID system;
   determining that the entity has authorized the user to access the electronic resource based on the user identification unique to the user and the password;
   extracting an expected location of the user within the timeframe from unstructured text of the schedule using text analytics on the unstructured text of the schedule;
   subsequent to determining that the user is a user authorized to access the electronic resource, determining whether the expected location of the user matches, within a threshold, the received location of the user attempting to access the electronic resource; and
   performing an action based on the determination.

2. The method of claim 1, wherein, responsive to determining that the expected location of the user matches, within the threshold, the received location of the user attempting to access the electronic resource, the action comprises causing the user to be granted access to the electronic resource.

3. The method of claim 1, wherein, responsive to determining that the expected location of the user does not match, within the threshold, the received location of the user attempting to access the electronic resource, the action comprises causing the user to be denied access to the electronic resource.

4. The method of claim 1, wherein, responsive to determining that the expected location of the user does not match, within the threshold, the received location of the user attempting to access the electronic resource, the action comprises causing a biometric authentication requirement to be presented to the user, wherein the biometric authentication requirement includes, at least, a prompt for the user to speak into a microphone to compare the user's voice to a stored voice associated with the user identification.

5. The method of claim 1, wherein, responsive to determining that the expected location of the user does not match, within the threshold, the received location of the user attempting to access the electronic resource, causing an alert to be provided to a host of the electronic resource.

6. A computer program product for securing access to a resource, the computer program product comprising:
one or more computer readable hardware storage devices and program instructions stored on the one or more computer readable hardware storage devices, the program instructions comprising:
program instructions to receive a schedule indicating an expected location of a user within a timeframe, wherein:
text contained in the schedule was populated by an entity and the schedule is unmodifiable by the user; and
the schedule is associated with a user identification unique to the user;
program instructions to connect a computing device of the user to a network;
program instructions to receive, from the computing device connected to the network, an indication, via the network, of the user attempting to access an electronic resource at a storage location that is accessible via the network, within the timeframe, wherein the indication includes the user identification unique to the user and a password;
program instructions to determine a location of the first user utilizing a radio-frequency identification (RFID) system and receiving RFID tag information associated with the user, wherein the RFID tag information was obtained from an RFID tag reader of the RFID system;
program instructions to determine that the entity has authorized the user to access the electronic resource based on the user identification unique to the user and the password;
program instructions to extract an expected location of the user within the timeframe from unstructured text of the schedule using text analytics on the unstructured text of the schedule;
program instructions to, subsequent to determining that the user is a user authorized to access the electronic resource, determine whether the expected location of the user matches, within a threshold, the received location of the user attempting to access the electronic resource; and
program instructions to perform an action based on the determination.

7. The computer program product of claim 6, wherein, responsive to determining that the expected location of the user matches, within the threshold, the received location of the user attempting to access the electronic resource, the action comprises causing the user to be granted access to the electronic resource.

8. The computer program product of claim 6, wherein, responsive to determining that the expected location of the user does not match, within the threshold, the received location of the user attempting to access the electronic resource, the action comprises causing the user to be denied access to the electronic resource.

9. The computer program product of claim 6, wherein, responsive to determining that the expected location of the user does not match, within the threshold, the received location of the user attempting to access the electronic resource, the action comprises causing a biometric authentication requirement to be presented to the user, wherein the biometric authentication requirement includes, at least, a prompt for the user to speak into a microphone to compare the user's voice to a stored voice associated with the user identification.

10. The computer program product of claim 6, wherein, responsive to determining that the expected location of the user does not match, within the threshold, the received location of the user attempting to access the electronic resource, the action comprises causing an alert to be provided to a host of the electronic resource.

11. A computer system for securing access to a resource, the computer system comprising:
one or more computer processors, one or more computer readable storage devices, and program instructions stored on the computer readable storage devices for execution by at least one of the one or more computer processors, the program instructions comprising:
program instructions to receive a schedule indicating an expected location of a user within a timeframe, wherein:
text contained in the schedule was populated by an entity and the schedule is unmodifiable by the user; and
the schedule is associated with a user identification unique to the user;
program instructions to connect a computing device of the user to a network;
program instructions to receive, from the computing device connected to the network, an indication, via the network, of the user attempting to access an electronic resource at a storage location that is accessible via the network within the timeframe, wherein the indication includes the user identification unique to the user and a password;
program instructions to determine a location of the first user utilizing a radio-frequency identification (RFID) system and receiving RFID tag information associated with the user, wherein the RFID tag information was obtained from an RFID tag reader of the RFID system;
program instructions to determine that the entity has authorized the user to access the electronic resource based on the user identification unique to the user and the password;
program instructions to extract an expected location of the user within the timeframe from unstructured text of the schedule using text analytics on the unstructured text of the schedule, wherein program instructions to extract the expected location of the user within the timeframe from the unstructured text of the schedule using text analytics on the unstructured text of the schedule comprise:

program instructions to parse the unstructured text of the schedule to identify at least the expected location of the user within the timeframe;

program instructions to, subsequent to determining that the user is a user authorized to access the electronic resource, determine whether the expected location of the user matches, within a threshold, the received location of the user attempting to access the resource; and responsive to determining that the expected location of the user does not match, within the threshold, the received location of the user attempting to access the resource:

causing an alert to be provided to a host of the resource; and causing a biometric authentication requirement to be presented to the user, wherein the biometric authentication requirement includes, at least, a prompt for the user to speak into a microphone to compare the user's voice to a stored voice associated with the user identification.

12. The computer system of claim 11, wherein, responsive to determining that the expected location of the user matches, within the threshold, the received location of the user attempting to access the resource, the action comprises causing the user to be granted access to the resource.

13. The computer system of claim 11, wherein, responsive to determining that the expected location of the user does not match, within the threshold, the received location of the user attempting to access the resource, the action comprises causing the user to be denied access to the resource.

14. The method of claim 1, wherein the resource is a database.

15. The method of claim 1, wherein the resource is a website.

16. The method of claim 1, wherein extracting the expected location of the user within the timeframe from the unstructured text of the schedule using text analytics on the unstructured text of the schedule comprises:

parsing the unstructured text of the schedule to identify at least the expected location of the user within the timeframe.

* * * * *